United States Patent [19]

Vona, Jr. et al.

[11] 4,154,811

[45] May 15, 1979

[54] METHOD FOR PRODUCING HYDROHALIC ACIDS IN A DIESEL ENGINE

[75] Inventors: Paul J. Vona, Jr.; Donald I. Townsend, both of Midland; Lewis M. Brown, Freeland, all of Mich.

[73] Assignee: The Dow Chemical Company, Midland, Mich.

[21] Appl. No.: 839,851

[22] Filed: Oct. 6, 1977

[51] Int. Cl.² ............................................. C01B 7/08
[52] U.S. Cl. .................................. 423/481; 423/240
[58] Field of Search .............. 423/481, 483, 543, 212, 423/540; 44/79

[56] References Cited

U.S. PATENT DOCUMENTS

| | | | |
|---|---|---|---|
| 2,281,598 | 5/1942 | Prutton | 44/79 X |
| 2,415,904 | 2/1947 | Odell | 423/573 G UX |
| 2,508,297 | 5/1950 | Ruth | 423/212 |
| 2,686,879 | 8/1954 | Stoltz | 423/212 |
| 2,790,506 | 4/1957 | Van Vactor | 423/212 |
| 3,268,296 | 8/1966 | Hall | 423/481 X |
| 3,832,412 | 8/1974 | Messina | 44/79 |
| 3,984,206 | 10/1976 | Winnen | 423/481 X |

FOREIGN PATENT DOCUMENTS

| | | | |
|---|---|---|---|
| 50-104794 | 8/1975 | Japan | 423/481 |
| 240801 | 11/1926 | United Kingdom | 423/543 |
| 1181132 | 2/1970 | United Kingdom | 423/483 |

OTHER PUBLICATIONS

"Chem. Engineers' Handbook", by J. H. Perry, Third Ed., 1950, pp. 1652–1655, McGraw-Hill Book Co., Inc., N.Y.

Primary Examiner—G. O. Peters
Attorney, Agent, or Firm—V. Dean Clausen

[57] ABSTRACT

A method is disclosed for producing hydrohalic acids, using a Diesel engine for a reactor. In a typical operation for producing hydrochloric acid, the engine fuel is a liquid phase mixture containing a hydrocarbon, such as Diesel fuel oil, and one or more halogenated organic compounds, such as carbon tetrachloride and propylene dichloride. The liquid phase fuel is injected into the combustion chamber of the engine, where it is vaporized, ignited and burned. In the resulting combustion reaction, hydrochloric acid is formed as a vapor phase. The acid can then be recovered as a vapor phase or an aqueous solution.

9 Claims, 1 Drawing Figure

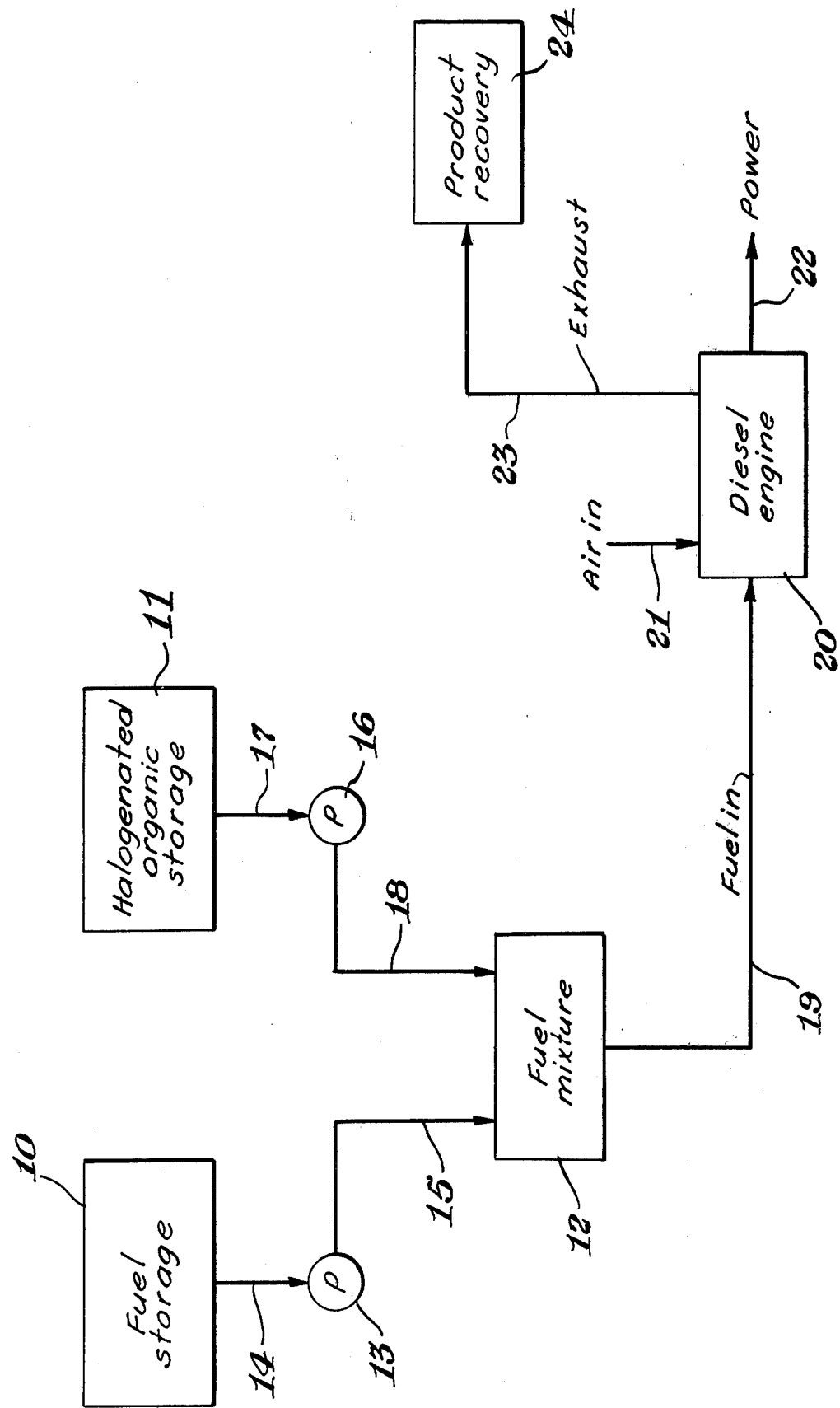

METHOD FOR PRODUCING HYDROHALIC ACIDS IN A DIESEL ENGINE

BACKGROUND OF THE INVENTION

Broadly, the invention relates to a method for producing halogen products. In particular, the invention is directed to a method for burning a fuel mixture containing a halogenated organic compound, in a Diesel engine to produce a hydrohalic acid, such as hydrochloric acid.

In the chemical industry it is frequently a problem to dispose of waste chemicals which contain elemental halogens or halogenated organic compounds. One means which has been used to solve the problem is to incinerate the waste substances in a fire tube boiler. When chlorinated or brominated waste hydrocarbons are burned in a fire tube boiler, HCl or HBr can usually be recovered as a useful by-product.

The fire tube boiler thus provides a means for disposing of waste materials and, at the same time, provides a means for producing useful chemicals. However, this technique for producing a halogen acid, such as HCl, is not generally considered as a commercially feasible process. One problem is that special absorber units and other auxiliary equipment are required to recover HCl from the vent gases of fire tube boilers. Another problem is that HCl produced in this manner contains a high percentage of $Cl_2$. This is a particular disadvantage in that HCl containing high amounts of $Cl_2$ cannot be used in many applications. Another drawback in using fire tube boilers for incinerating waste products is that only the thermal energy can be recovered for other uses.

In the practice of the present invention, waste substances containing halogenated organics can be burned in a Diesel engine. The engine thus provides a means for disposing of waste products and it also provides a reactor for producing a hydrohalic acid, such as HCl, which contains only a very small amount of $Cl_2$. In addition, the Diesel engine supplies both heat and mechanical energy, which can be used in chemical processing, generating electricity, and the like.

SUMMARY OF THE INVENTION

The invention concerns a method for producing hydrohalic acids, utilizing a Diesel engine as a reactor. In this method a liquid phase organic compound is mixed with a halogenated organic compound. This liquid phase mixture provides a suitable fuel for a Diesel engine. During operation of the Diesel engine, air is drawn into the combustion chamber, compressed, and heated to a temperature high enough to ignite a vapor phase of the liquid fuel mixture. The liquid fuel mixture is then injected into the combustion chamber of the Diesel engine and vaporized during the injection step.

In the combustion chamber the vapor phase fuel mixture is ignited and burned. During the burning of this vapor phase a reaction occurs which produces a hydrohalic acid, in a vapor phase. The halogen acid can then be recovered from the combustion chamber of the engine, either as a vapor phase or as an aqueous solution.

DESCRIPTION OF THE DRAWING

The single FIGURE of this drawing is a schematic illustration of one embodiment of a system, which includes a Diesel engine, for producing a halogen compound according to the method of this invention.

DESCRIPTION OF A PREFERRED EMBODIMENT

In the drawing numeral 10 refers to a vessel for storing a liquid phase organic compound, such as hydrocarbon Diesel fuel. A second vessel 11 provides means for storing a liquid phase halogenated organic compound. A third vessel 12 is located near the storage vessels 10 and 11. The vessel 12 is preferably a vertical tank, which includes a power-operated mixer unit (not shown). A pump 13 is connected into vessel 10 by a line 14. The outlet of pump 13 connects into tank 12 through a line 15. A second pump 16 is connected into vessel 11 by a line 17. On the outlet side, pump 16 is connected into tank 12 by a line 18.

A fuel line 19 connects tank 12 into the injection nozzle (not shown) of a Diesel engine 20. The air intake of engine 20 is indicated by numeral 21. The crankshaft of engine 20, which represents power output, is indicated by numeral 22. The exhaust header (not shown) of engine 20 is connected by a line 23 into a product recovery unit 24.

A typical operation of the system shown herein will now be described to illustrate the practice of this invention. The first step in the operation is to bring the Diesel engine 20 up to a suitable operating temperature. This is done by running the engine for a short period using only a conventional Diesel fuel oil (petroleum distillate). After the engine 20 reaches operating temperature, the liquid phase organic compound is pumped from vessel 10 into mixing tank 12. At the same time, the liquid phase halogenated organic compound in vessel 11 is pumped into tank 12. In tank 12, the liquid phase organic and the liquid phase halogenated organic compound are thoroughly mixed by the mixer unit in the tank.

In a given operating cycle of engine 20, atmospheric air is drawn into the combustion chamber of the engine through intake 21, on the intake stroke. On the compression stroke, the rising piston in the combustion chamber compresses the atmospheric air to about 500 psi. Compression of the air raises its temperature to about 1000° F. Near the end of the compression stroke, the liquid phase fuel mixture in tank 12 is pumped into the combustion chamber through the injecion nozzle in engine 20. The liquid phase fuel mixture is atomized by the injection nozzle and vaporized as it passes through the combustion chamber.

During the power stroke of engine 20, the hot air in the combustion chamber causes the vapor phase fuel mixture to ignite, burn and expand. When the vapor phase mixture in the combustion chamber ignites and burns, a reaction takes place between the organic compound and the halogenated organics which make up the fuel mixture. The resulting combustion product will contain a hydrohalic acid, in the vapor phase. Following the power stroke, the exhaust valve in the combustion chamber opens into an exhaust header. As the piston rises on the exhaust stroke, the combustion product (the burned gases) are forced through the open valve and header and into the exhaust line 23.

The halogenated compound can then be recovered directly from exhaust line 23, as a vapor phase product. Alternatively, the exhaust gas in line 23 may be passed through a water scrubber to recover the halogenated vapor phase as an aqueous solution of the reaction product. Other recovery means would include condensing the vapor phase product. Numeral 24 refers to a suitable product recovery unit, such as a water scrubber.

Regarding the liquid phase organic compound in the fuel mixture, it is preferred to use a conventional Diesel fuel oil, which is composed chiefly of aliphatic hydrocarbons. The commercially available Diesel fuel oils are usually designated in three grades: No. 1-D, No. 2-D, and No. 3-D fuel oil. Material specifications for these Diesel fuels are listed in a standard engineering reference entitled "Handbook of Engineering Fundamentals", 3rd Edition, O. W. Eshbach et al. (John Wiley & Sons) Table 143, page 1498.

The preferred liquid phase halogenated organic compounds which may be used in the fuel mixture are the halogen derivatives of aliphatic hydrocarbons, alicyclic hydrocarbons, and aromatic hydrocarbons. Typical of the halogen-substituted aliphatic hydrocarbons are carbon tetrachloride, propylene dichloride, tetrachloroethane, acetylene tetrabromide, methyl bromide, chloroform, methylchloroform, methylene chloride, vinyl chloride, vinylidene chloride, bromochloromethane, and tetrafluoromethane. Representative compounds in the group of halogen-substituted alicyclic hydrocarbons are cyclohexyl chloride, cyclohexyl bromide, and cyclopropyl chloride. Some of the halogen-substituted aromatic hydrocarbons which may be used are monochlorobenzene, dichlorobenzene, tetrachlorobenzene, tetrachlorophenol, bromobenzene, 2,4-dibromophenol, and fluorobenzene.

Other compounds which may be used in the fuel mixture are certain halogenated carboxylic acids and esters, halogenated heterocyclics, and halogenated oxirane compounds. The carboxylic compounds would include monochloro-, dichloro-, and trichloroacetic acid and their corresponding methyl, ethyl, and propyl esters. Heterocyclic compounds which might be used are pentachloropyridine, and 2-chloropyrrole. Suitable oxirane compounds are epichlorohydrin, and 3,4-dichloro-1,2-butylene oxide.

The liquid phase organic compound, such as Diesel fuel oil, should be present in the fuel mixture in an amount of from about 10 to about 90 percent by weight of the mixture. For the liquid phase halogenated organic compounds, the concentration should also be from about 10 to about 90 percent by weight of the fuel mixture. In general, the fuel mixture must have those chemical and physical properties which enable the Diesel engine to operate properly. Such properties would include a certain heat value, viscosity, and pourpoint. The actual properties will depend on the type of Diesel engine used, weather conditions, and other factors familiar to those skilled in the art of Diesel engine operation.

The following examples are given to illustrate the practice of this invention. These examples are not intended to limit the invention to the embodiments described herein.

EXAMPLE I

This example describes a procedure for preparing hydrochloric acid, according to the method of this invention. The first step was to run the Diesel engine 20 for a period of about 15 minutes, using only a No. 2-D Diesel fuel oil. This was done to bring the engine up to a normal operating temperature. After the engine had reached a suitable operating temperature, a composition containing 25 pounds of No. 2-D Diesel fuel oil and 75 pounds carbon tetrachloride was thoroughly mixed in tank 12.

After about one hour of operation, the exhaust gases from the Diesel engine 20 were sampled. The gas sample was collected from the exhaust line 23 at a point between the engine 20 and recovery unit 24. The gas collection point is not shown in the drawing. Using a known procedure, the gas samples were analyzed for the presence of hydrogen chloride gas, and nitrogen oxides. On the basis of 100 pounds of exhaust gas, the composition was 1.56 pounds hydrogen chloride, 160 ppm nitrogen oxides, and less than 50 ppm chlorine.

EXAMPLE II

This is another example for preparing hydrochloric acid. The procedure was the same as described in Example I. The Diesel engine 20 was operated on a fuel mixture containing 23.8 pounds No. 2-D Diesel fuel oil, 64.5 pounds carbon tetrachloride, and 11.7 pounds propylene dichloride. Analysis of the exhaust gas showed 3.85 pounds hydrogen chloride, 100 ppm nitrogen oxides, and less than 50 ppm chlorine, based on 100 pounds of exhaust gas.

EXAMPLE III

This is another example for preparing hydrochloric acid. Following the procedure of Example I, the Diesel engine 20 was operated on a fuel mixture containing 15 pounds No. 2-D Diesel fuel oil and 85 pounds tetrachloroethane. The exhaust gas analysis showed 3.1 pounds hydrogen chloride, 200 ppm nitrogen oxides, and less than 50 ppm chlorine, based on 100 pounds exhaust gas.

EXAMPLE IV

This is another example for preparing hydrochloric acid. Using the procedure of Example I, the Diesel engine 20 was operated on a fuel mixture containing 35 pounds No. 2-D Diesel fuel oil and 65 pounds tetrachloroethane. The exhaust gas was found to contain 1.04 pounds hydrogen chloride, 180 ppm nitrogen oxides, and less than 50 ppm chlorine, based on 100 pounds of exhaust gas.

EXAMPLE V

This is another example for preparing hydrochloric acid. The procedure was the same as described in Example I. The Diesel engine 20 was operated on a fuel mixture containing 70 pounds No. 2-D Diesel fuel oil, 25 pounds carbon tetrachloride, and 5 pounds propylene dichloride. The exhaust gas analysis showed 1.56 pounds hydrogen chloride, 75 ppm nitrogen oxides, and less than 50 ppm chlorine, based on 100 pounds of exhaust gas.

EXAMPLE VI

This is another example for preparing hydrochloric acid. The procedure was the same as described in Example I. The Diesel engine 20 was operated on a fuel mixture containing 50 pounds No. 2-D Diesel fuel oil, 40 pounds carbon tetrachloride, and 10 pounds propylene dichloride. The exhaust gas analysis showed 2.67 pounds hydrogen chloride, 100 ppm nitrogen oxides, and less than 50 ppm chlorine.

EXAMPLE VII

This is another example for preparing hydrochloric acid. The procedure was the same as described in Example I. The Diesel engine 20 was operated on a fuel mixture containing 50 pounds No. 2-D Diesel fuel oil, 42 pounds carbon tetrachloride, and 8 pounds propylene dichloride. The exhaust gas analysis showed 1.8 pounds hydrogen chloride, 150 ppm nitrogen oxides, and less than 30 ppm chlorine, based on 100 pounds exhaust gas. During operation of the engine, the exhaust gas in line 23 was passed into a water scrubber unit (as indicated by numeral 24), to recover the HCl as an aqueous solution, in which the acid concentration was about 22%.

EXAMPLE VIII

This example describes a procedure for preparing hydrobromic acid, according to the practice of this invention. The procedure was essentially the same as described in Example I. The Diesel engine 20 was operated on a fuel mixture containing 33.4 pounds No. 2-D Diesel fuel oil and 66.6 pounds acetylene tetrabromide. The exhaust gas was analyzed and found to contain 3.1 pounds hydrogen bromide, which included 0.2 pounds $Br_2$, and 130 ppm nitrogen oxides, based on 100 pounds exhaust gas.

Any of the conventional single cylinder or multicylinder Diesel engines, either two-cycle or four-cycle, may be used in the practice of this invention. Following are engineering specifications for the Diesel engine used in preparing the hydrohalic acids described in the examples set out above.

DIESEL ENGINE SPECIFICATIONS

Engine Type — Onan Diesel, 4-cycle, single cylinder, vertical design, air cooled
Cylinder Bore — $3\frac{1}{4}$ inches
Piston Stroke — $3\frac{5}{8}$ inches
Piston Displacement — 30 cu. inches
Compression Ratio — 19:1
Piston Speed — 1087 fpm
Power Factor — 5.7 bhp at 1800 rpm As described earlier, the Diesel engine used in the method of this invention provides a reactor for producing a hydrohalic acid, such as HCl, which contains only a very small amount of $Cl_2$. With regard to HCl, the reaction which takes place in the vapor phase fuel mixture in the combustion chamber of the engine produces HCl which contains less than 50 ppm chlorine ($Cl_2$), as indicated in the examples. This is a specific advantage over other processes for making halogen-containing compounds, such as incinerating of chlorinated hydrocarbons in fire tube boilers.

The invention claimed is:

1. A method for producing a hydrohalic acid which comprises:
    mixing a liquid phase hydrocarbon Diesel fuel oil with about 10 to about 90 percent by weight of a liquid phase compound selected from the group consisting of halogenated aliphatic hydrocarbons, halogenated alicyclic hydrocarbons, halogenated aromatic hydrocarbons, and mixtures thereof, to obtain a liquid phase fuel mixture for a Diesel engine;
    drawing air into the combustion chamber of a Diesel engine and compressing said air to a temperature sufficient to ignite a vapor phase of the liquid phase fuel mixture;
    injecting the liquid phase fuel mixture into the combustion chamber of a Diesel engine and vaporizing the liquid phase fuel mixture during the injection step;
    igniting and burning the vapor phase fuel mixture in the combustion chamber of the Diesel engine to obtain a combustion reaction product which contains a vapor phase hydrohalic acid;
    discharging the combustion reaction product from the combustion chamber of the Diesel engine; and
    recovering the vapor phase hydrohalic acid in the combustion reaction product as an aqueous solution of said hydrohalic acid.

2. The method of claim 1 in which the liquid phase halogenated hydrocarbon is selected from the group consisting of chlorinated derivatives of aliphatic hydrocarbons, and mixtures thereof.

3. The method of claim 1 in which the liquid phase halogenated hydrocarbon is selected from the group consisting of brominated aliphatic hydrocarbons, and mixtures thereof.

4. The method of claim 1 in which the liquid phase halogenated hydrocarbon is selected from the group consisting of fluorinated derivatives of aliphatic hydrocarbons, and mixtures thereof.

5. The method of claim 1 in which the liquid phase halogenated hydrocarbon is a mixture of carbon tetrachloride and propylene dichloride, and the combustion reaction product contains hydrochloric acid in a vapor phase.

6. The method of claim 1 in which the liquid phase halogenated hydrocarbon is tetrachloroethane, and the combustion reaction product contains hydrochloric acid in a vapor phase.

7. The method of claim 1 in which the liquid phase halogenated hydrocarbon is acetylene tetrabromide, and the combustion reaction product contains hydrobromic acid in a vapor phase.

8. The method of claim 1 in which the liquid phase halogenated hydrocarbon is tetrafluoroethane, and the combustion reaction product contains hydrofluoric acid in a vapor phase.

9. A method for producing hydrochloric acid which comprises the steps of:
    mixing a liquid phase hydrocarbon Diesel fuel oil with about 10 to about 90 percent by weight of a liquid phase mixture of carbon tetrachloride and propylene dichloride, to obtain a liquid phase fuel mixture for a Diesel engine;
    drawing air into the combustion chamber of a Diesel engine and compressing said air to a temperature sufficient to ignite a vapor phase of the liquid phase fuel mixture;
    injecting the liquid phase fuel mixture into the combustion chamber of the Diesel engine and vaporizing the liquid phase fuel mixture during the injection step;
    igniting and burning the vapor phase fuel mixture in the combustion chamber of the Diesel engine, to obtain a combustion reaction product which contains hydrochloric acid in a vapor phase;
    discharging the combustion reaction product from the combustion chamber of the Diesel engine; and
    scrubbing the combustion reaction product with water to recover the vapor phase hydrochloric acid as an aqueous solution of hydrochloric acid.

* * * * *